US007107187B1

(12) United States Patent
Saghier et al.

(10) Patent No.: US 7,107,187 B1
(45) Date of Patent: Sep. 12, 2006

(54) METHOD FOR MODELING SYSTEM PERFORMANCE

(75) Inventors: Dean Lee Saghier, Olathe, KS (US); Justin A. Martin, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 503 days.

(21) Appl. No.: 10/706,707

(22) Filed: Nov. 12, 2003

(51) Int. Cl.
*G06F 19/00* (2006.01)

(52) U.S. Cl. .................... 702/186; 703/22; 702/182

(58) Field of Classification Search ...................... None
See application file for complete search history.

(56) References Cited

U.S. PATENT DOCUMENTS

| | | | | |
|---|---|---|---|---|
| 5,848,270 A * | 12/1998 | DeLuca et al. | ............. | 718/105 |
| 5,950,212 A * | 9/1999 | Anderson et al. | ........... | 707/205 |
| 6,363,332 B1 * | 3/2002 | Rangarajan et al. | ........ | 702/185 |
| 6,393,480 B1 * | 5/2002 | Qin et al. | .................... | 709/224 |
| 6,542,854 B1 * | 4/2003 | Yang et al. | ................. | 702/186 |
| 6,574,587 B1 * | 6/2003 | Waclawski | .................. | 702/186 |
| 6,606,658 B1 * | 8/2003 | Uematsu | ...................... | 709/225 |
| 6,643,613 B1 * | 11/2003 | McGee et al. | ............. | 702/186 |
| 6,691,067 B1 * | 2/2004 | Ding et al. | ................. | 702/186 |
| 6,760,684 B1 * | 7/2004 | Yang et al. | ................. | 702/182 |
| 6,801,940 B1 * | 10/2004 | Moran et al. | ............... | 709/224 |
| 6,826,575 B1 * | 11/2004 | Waclawski | .................. | 707/102 |
| 6,862,623 B1 * | 3/2005 | Odhner et al. | ............. | 709/226 |
| 6,898,564 B1 * | 5/2005 | Odhner et al. | ................ | 703/21 |
| 6,954,779 B1 * | 10/2005 | Duggan et al. | ............. | 709/203 |
| 6,973,415 B1 * | 12/2005 | Saghier et al. | ............. | 702/186 |
| 6,988,054 B1 * | 1/2006 | Giffords | ...................... | 702/186 |
| 6,993,458 B1 * | 1/2006 | Castelli et al. | ............. | 702/186 |
| 7,016,810 B1 * | 3/2006 | Stanley | ....................... | 702/186 |
| 7,024,336 B1 * | 4/2006 | Salsbury et al. | ............ | 702/182 |
| 2002/0099521 A1 * | 7/2002 | Yang et al. | ................. | 702/186 |
| 2002/0183972 A1 * | 12/2002 | Enck et al. | ................. | 702/186 |
| 2003/0074161 A1 * | 4/2003 | Smocha et al. | ............. | 702/186 |
| 2003/0126254 A1 * | 7/2003 | Cruickshank et al. | ....... | 709/224 |
| 2003/0126255 A1 * | 7/2003 | Rice et al. | ................... | 709/224 |
| 2003/0139900 A1 * | 7/2003 | Robison | ...................... | 702/179 |
| 2004/0059544 A1 * | 3/2004 | Smocha et al. | ............. | 702/182 |
| 2004/0088406 A1 * | 5/2004 | Corley et al. | ............... | 709/224 |
| 2004/0133395 A1 * | 7/2004 | Ding et al. | ................. | 702/182 |
| 2005/0060598 A1 * | 3/2005 | Klotz et al. | .................... | 714/4 |

\* cited by examiner

*Primary Examiner*—Patrick J. Assouad

(57) ABSTRACT

The present invention provides a method for modeling the performance of a system comprising computer software operating on computer hardware. In accordance with the present invention, system performance is modeled by fitting non-linear curves to data points for system performance parameters, such as response time and throughput, as a function of load. Data points may be measured in testing may be measured through monitoring a system operating in a production environment. While a variety of non-linear curves may be used in accordance with the present invention, a logarithmic curve may be used to model system throughput and an exponential curve may be used to model system response time. By defining a relationship between throughput and response time a distance may be calculated between the curves, and this distance may be used to determine an optimal load. Additionally, a graph displaying both throughput and response time as a function of load may be displayed to a system operator in a graphical user interface to facilitate the evaluation of system performance.

8 Claims, 7 Drawing Sheets

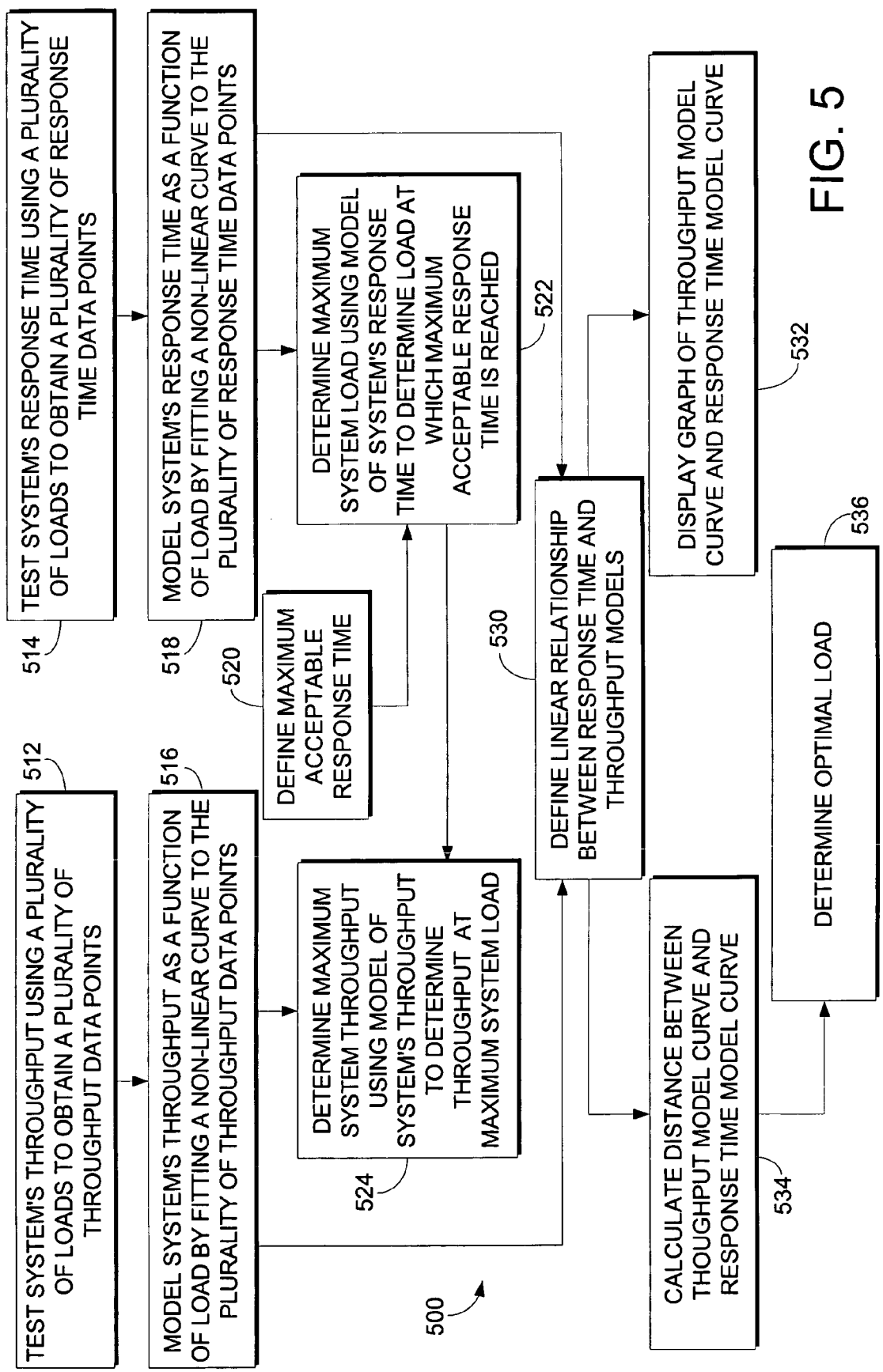

METHOD FOR MODELING SYSTEM PERFORMANCE

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to the modeling of systems comprising computer software operating on computer hardware. More particularly, the present invention relates to the modeling of system performance, such as throughput and response time as a function of load, as non-linear functions for use in predicting system performance and issuing alarms when system performance exceeds predetermined performance parameters.

BACKGROUND OF THE INVENTION

Computing systems have become an integral part of business, government, and most other aspects of modern life. Most people are likely regrettably familiar with poor performing computer systems. A poor performing computer system may be simply poorly designed and, therefore, fundamentality incapable of performing well. Even well-designed systems will perform poorly, however, if inadequate resources necessary to meet the demands placed upon the system are not available. Properly matching the resources available to a system with the demand placed upon the system requires both accurate capacity planning and adequate system testing to predict the resources that will be necessary for the system to function properly at the loads expected for the system.

Predicting the load that will be placed upon a system may involve a number of issues, and this prediction may be performed in a variety of ways. For example, future load on a system may be predicted using data describing the historical change in the demand for the system. Such data may be collected by monitoring a system or its predecessor, although such historical data may not always be available, particularly if the system is entirely new. Other methods, such as incorporating planned marketing efforts or other future events known to be likely to occur, may also be used. The way in which load on a system is predicted is immaterial to the present invention.

Regardless how a prediction of future system load is made, a system must have adequate resources to meet that demand if the system is to perform properly. Determining what amount of resources are required to meet a given system demand may also be a complex problem. Those skilled in the art will realize that system testing may be performed, often before a system is deployed, to determine how the system will perform under a variety of loads. System testing may allow system managers to identify the load at which system performance becomes unacceptable, which may coincide with a load at which system performance becomes highly nonlinear. One skilled in the art will also appreciate that such testing can be an enormously complex and expensive proposition, and will further realize that such testing often does not provide accurate information as to at what load a system's performance will deteriorate. One reason for the expense and difficulty of testing is the large number of tests necessary to obtain a reasonably accurate model of system performance.

One skilled in the art will likely be familiar with the modeling of a system's performance as a linear function of load. One skilled in the art will further realize, however, that a linear model of system performance as a function of load is often a sufficiently accurate depiction of system performance within only a certain range of loads, which the range of loads within which system performance is substantially linear varying for different systems. System performance often becomes non-linear at some point as the load on the system increases. The point at which system performance becomes nonlinear may be referred to as the point at which the linear model breaks down. The load at which a system's performance begins to degrade in a non-linear fashion may be referred to as the knee. At the knee, system throughput increases more slowly while response times increase more quickly. It is often at this point that system performance suffers severely, but identifying this point in testing can be difficult. Accordingly, while a basic linear model theoretically can be obtained with as little as two data points, additional data points are necessary to determine when a linear model of system performance will break down. Obtaining sufficient data points to determine when a linear model of system performance breaks down often requires extensive testing. At the same time, such testing may not yield an accurate model of system performance, particularly as the system moves beyond a load range in which its performance is substantially linear.

SUMMARY OF THE INVENTION

The present invention uses a plurality of data points to model system performance by fitting a non-linear curve to the data points. The use of a non-linear curve may better identify the load at which a system's operation will become unacceptable. The use of the present invention may significantly reduce the number of test points required to sufficiently model a system's behavior. The present invention may also be utilized to identify a point of interest in system performance for use in monitoring a system in a production environment so that an alarm may if system performance exceeds predetermined parameters around the point of interest.

BRIEF DESCRIPTION OF THE SEVERAL VIEWS OF THE DRAWINGS

The present invention is described in detail below with reference to the attached drawing figures, wherein:

FIG. 5 illustrates a method in accordance with the present invention for modeling system performance in a testing environment; and FIG. 6A

DETAILED DESCRIPTION OF THE INVENTION

The present invention provides methods for modeling system performance, wherein a system comprises computer software operating on computer hardware. The present invention may be used to model the performance of a system comprising any computer software operating on any computer hardware. One example of such a system is an order processing system that receives orders input into a user interface, processes that information, and then provides pertinent information to persons or systems responsible for filling the orders. However, any system comprising software operating on hardware may be modeled using methods in accordance with the present invention. In accordance with methods in accordance with the present invention, data points for system performance may be obtained at a plurality of loads, and system performance may then be modeled by fitting a non-linear curve to the data points. One skilled in the art will appreciate that the data points used in accordance with the present invention to model system performance may be obtained in a variety of ways. By way of example, data points may be obtained through system testing or through monitoring system performance while the system is in use. A system that is in use may be described as being in a production environment. One skilled in the art will appreciate that numerous methods, procedures, techniques, and protocols exist or may be developed for system testing, and that any of these may be used in system testing to obtain data points for use in accordance with the present invention. Likewise, one skilled in the art will appreciate that a variety of methods, procedures, techniques, and protocols exist or may be developed for system monitoring, and that any of these may be used to monitor a system operating in its production environment to obtain data points for use in accordance with the present invention.

In the examples described herein, the system performance parameters measured and modeled are response time and throughput as a function of load. One skilled in the art will appreciate that other network performance parameters may also be modeled using methods in accordance with the present invention. Response time may be measured as the time required for a system request to be processed, throughput may be measured as the number of system requests processed in a given period of time, and load may be defined as the total number of system users, although one skilled in the art will realize that these parameters may be defined in a number of other ways.

Figure 1:
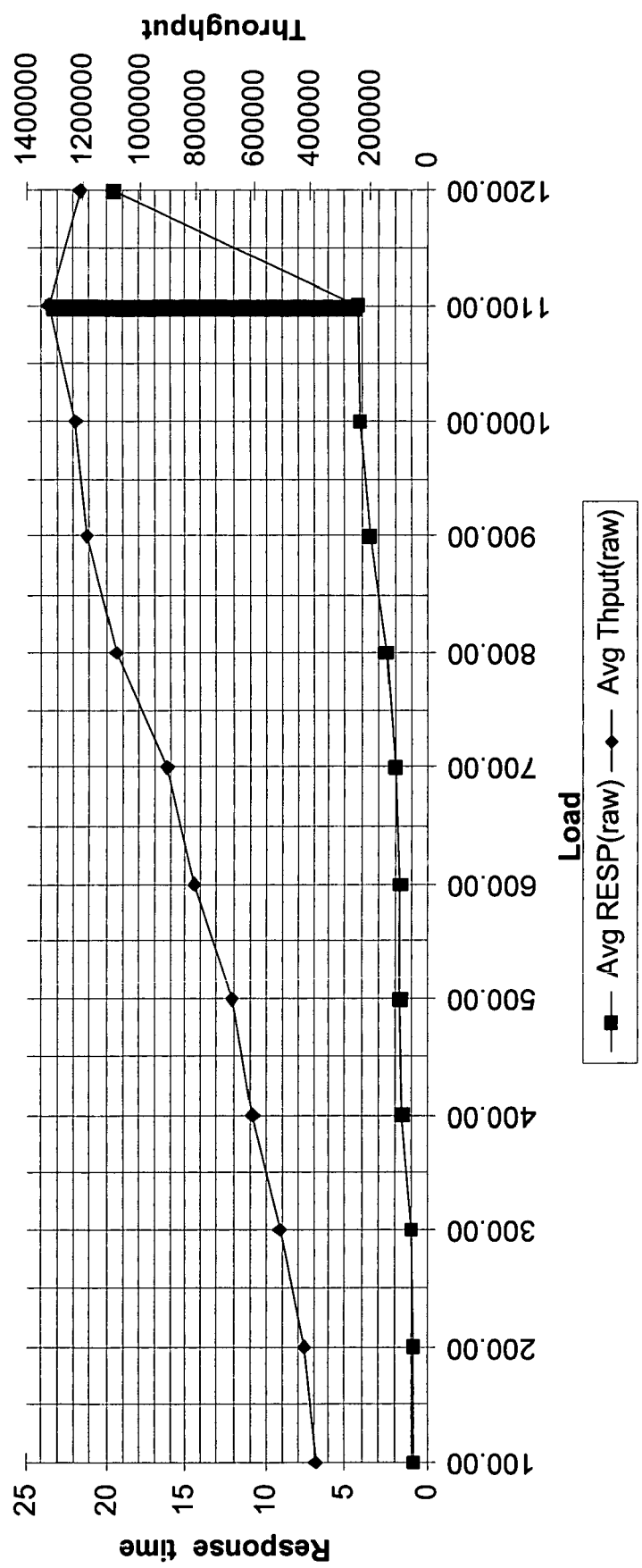
FIG. 1 is a graph illustrating test data points of system response time and throughput as a function of load.

FIG. 1 illustrates a graph depicting system performance data points at a variety of loads. FIG. 1 illustrates system response time and system throughput as a function of load on a single graph. As can be seen in FIG. 1, twelve data points were collected through testing for both response time and throughput. Solid lines connect collected data points, although no attempt has been made to fit a curve, either linear or nonlinear, to the data points in FIG. 1. In FIG. 1, response time is illustrated on the left vertical axis in units of seconds, throughput is illustrated on the right vertical axis in units of requests processed, and system load is illustrated on the horizontal axis in units of total users. As illustrated in FIG. 1, twelve data points were required to illustrate where system performance became extremely non-linear. As can be seen in FIG. 1, this knee occurs at a load of 1,100 users. It should be realized that FIG. 1 illustrates only a comparatively small set of data points. In actual practice, considerably more data points, and correspondingly more testing, may be required to satisfactorily forecast system performance and to identify the load at which system performance becomes non-linear and the load at which system performance will become unacceptable.

Figure 2:
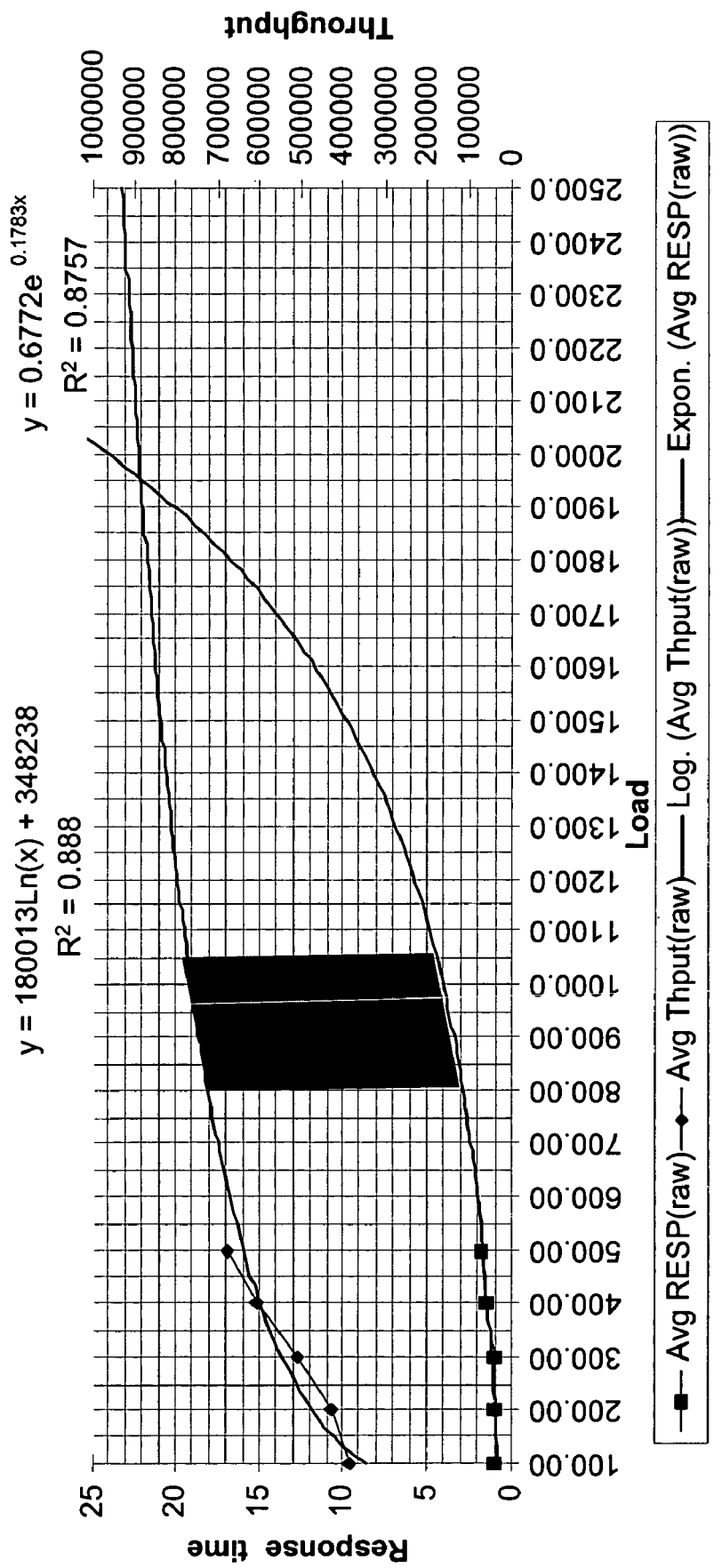
FIG. 2 is a graph illustrating non-linear curves using five test data points as a baseline of response time and throughput as a function of load.

Referring now to FIG. 2, non-linear curves are illustrated that have been fit to data points for response time and throughput as a function of load. The system modeled in FIG. 2 is the same as the system for which system performance is illustrated in FIG. 1. As can be seen in FIG. 2, only five response time data points and five throughput data points were used to model the non-linear curves. In FIG. 2, response time was modeled by fitting an exponential curve to the response time data points, while the throughput behavior was modeled by fitting a logarithmic curve to the throughput data points. As illustrated in FIG. 2, throughput was modeled as $y=180013Ln(x)+348238$ and response time was modeled as $y=0.6772e^{0.1783x}$, where x denotes system load. The numerical values in these equations may be determined using curve fitting techniques well known in the art that regressively fit a curve to data points by adjusting the constants of the equation until an optimal fit to the available data points is obtained. As illustrated in FIG. 2, the $R^2$ value, which is a measure of the quality of the fit of the curve to the data points, is reasonably high for each curve, being $R^2=0.888$ for response time and $R^2=0.8757$ for throughput. One skilled in the art will appreciate that any method for fitting a curve to collected data points may be used in this process. One skilled in the art will further realize that non-linear curves other than exponential and logarithmic curves may be used if the performance parameter being modeled performs in a manner that lends itself to a different mathematical model. A range in which the distance between the throughput and response time curves is maximized is illustrated by shading in FIG. 2. This range extends from a load of 800 users to a load of 1,050 users. As a load exceeds the optimal range, system performance may be compromised. The optimal range illustrated in FIG. 2 is obtained by identifying the load at which the distance between the response time and throughput curves is greatest. A range of loads may be defined around this identified optimal load in a variety of ways. For example, the optimal range may be defined as the range of loads at which the distance between the curves remains at a predetermined percentage of the maximum distance. Alternatively, the optimal range may be defined as a specific load range around the optimal load, however, such a definition may prove problematic in a rapidly changing system. In comparing FIG. 1 and FIG. 2, it should be noted that FIG. 2 utilizes less than half the data points utilized in FIG. 1. It should be further realized that while the non-linear curves modeled in FIG. 2 do not exactly match the lines connecting data points in FIG. 1, the optimal range identified using the curves in FIG. 2 identifies a maximum load very close to the load at which system response time and system throughput begins to behave in a highly non-linear fashion in FIG. 1. One skilled in the art will further realize that if considerably more data points were obtained in addition to those illustrated in FIG. 1, the resulting graph may likely even more closely resemble the models illustrated in FIG. 2.

Figure 3:
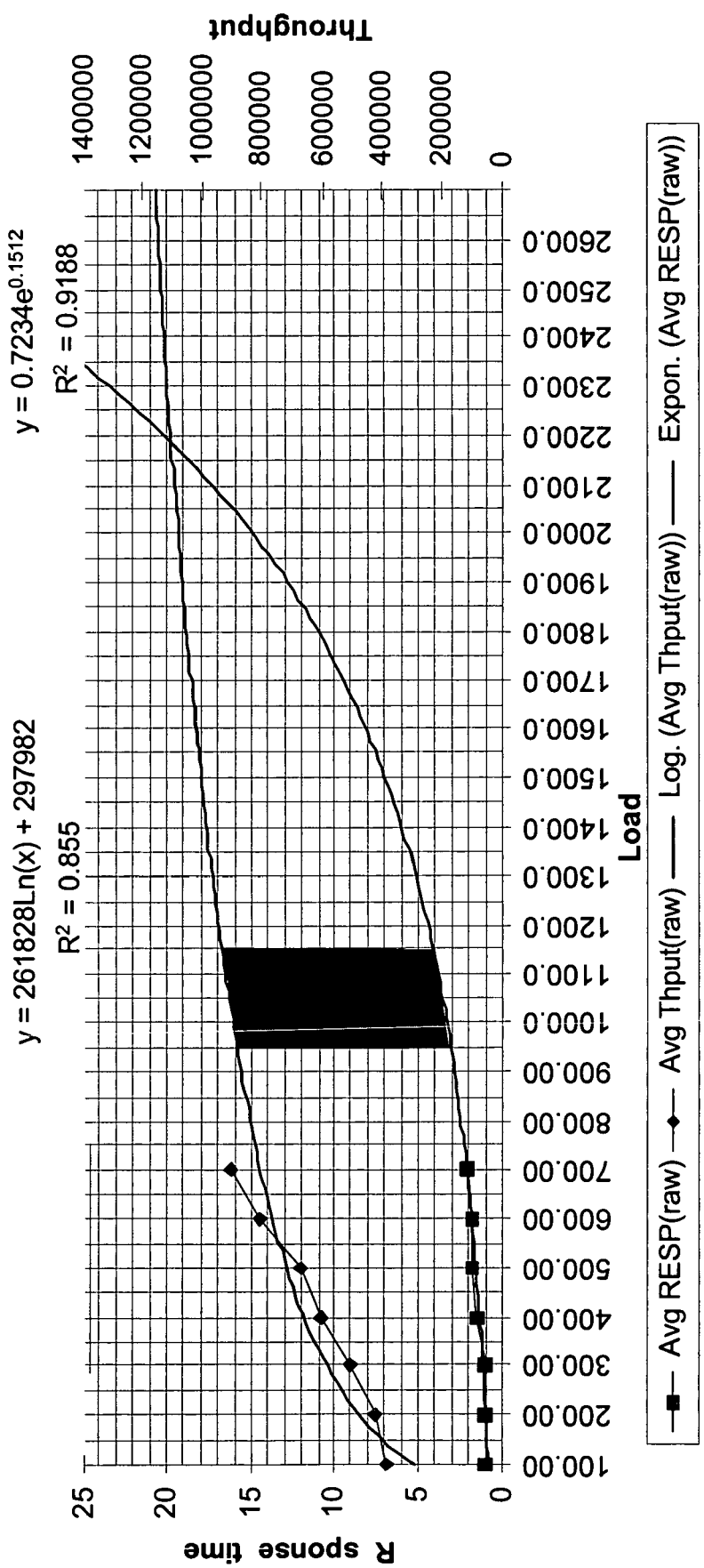
FIG. 3 is a graph illustrating non-linear curves using seven test data points as a baseline of response time and throughput as a function of load.

Referring now to FIG. 3 a model of system performance based upon seven data points is illustrated. The system whose performance was modeled in FIG. 2. The curves fit to the data points in FIG. 3 are, for system throughput, $y=261828Ln(x)+297982$, which provides an $R^2$ value of $R^2=0.855$, and for system response time, $y=0.7234e^{0.1512x}$, with an $R^2$ value of $R^2=0.9188$. As in FIG. 2, the optimal range determined in FIG. 3 is illustrated using a shaded rectangle. The optimal range determined in the model illustrated in FIG. 3 is a load of 950 users to 1,150 users. It should be noted that the optimal range determined in FIG. 3 using additional data points to fit the curves resembles the optimal range obtained in FIG. 2.

Figure 4:
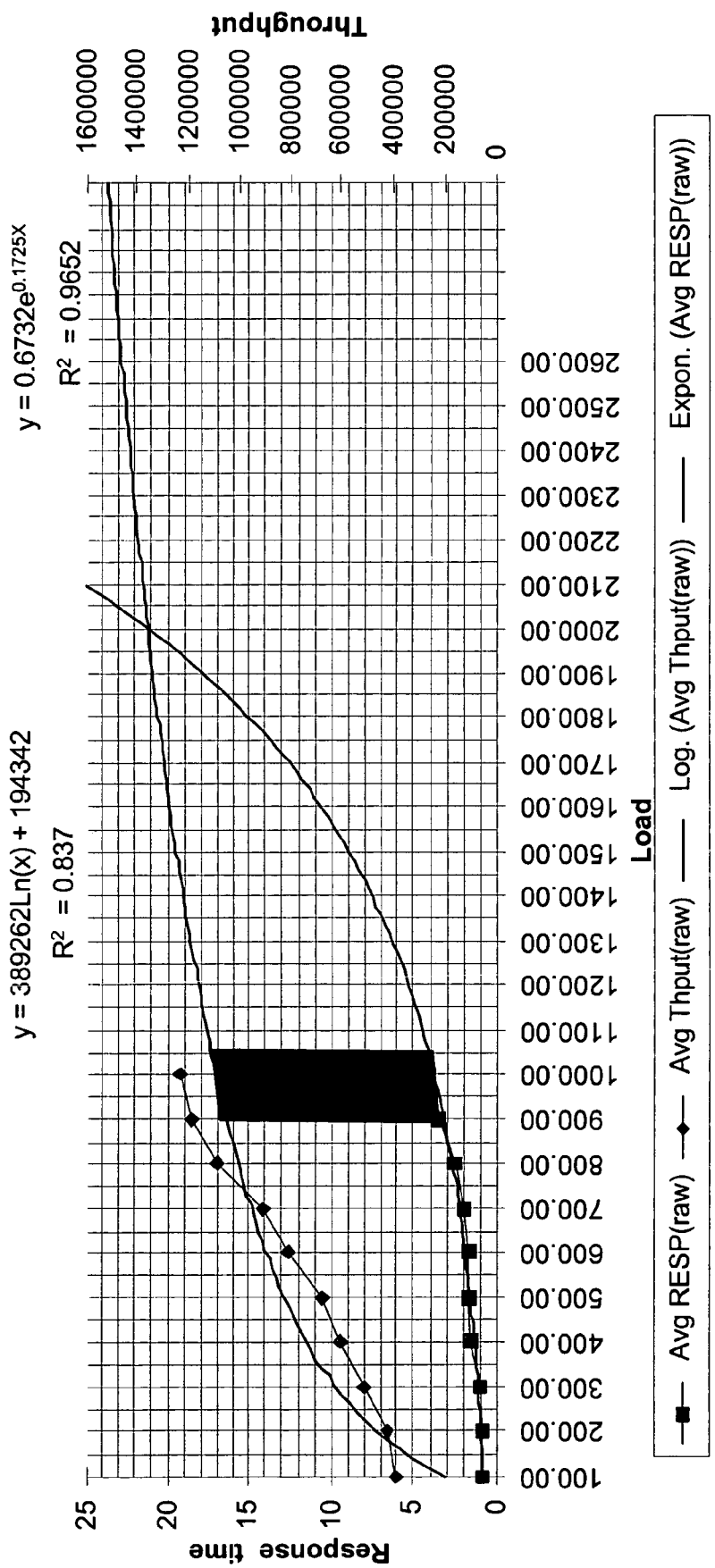
FIG. 4 is a graph illustrating non-linear curves using ten test data points as a baseline of response time and throughput as a function of load.

Referring now to FIG. 4 a model of system performance based upon ten data points is illustrated. The system modeled in FIG. 4 is the same system that was modeled in FIG. 2 and FIG. 3 is illustrated as modeled using ten data points. In modeling system throughput using a curve fit to the data points, the curve fit to the system throughput data points in FIG. 4 is $y=389262Ln(x)+194342$, which has a $R^2$ value of $R^2=0.837$. In fitting an exponential curve to the system response data points, the equation fit to the data points in FIG. 4 is $y=0.6732e^{0.1725x}$, with $R^2$ value of $R^2=0.9652$. The optimal range determined using the model illustrated in FIG. 4 is illustrated with a shaded rectangle. The optimal range determined based upon the model illustrated in FIG. 4 is from a load of 900 users to a load of 1,050 users. Once again, it should be noted that the optimal range determined in FIG. 4 corresponds well with the optimal range in FIG. 1, FIG. 2 and FIG. 3.

One skilled in the art will appreciate that a relationship between units of response time and units of throughput were defined to enable response time and throughput to be illustrated on a single graph in FIGS. 1–4, as well as to allow a distance between the curves to be defined. One skilled in the art will appreciate that the precise relationship between throughput and response time vary depending upon the system in question and the units used to measure throughput and response time, or whatever other network operation parameters are measured and modeled.

Graphs such as the graph illustrated in FIG. 2 may be particularly useful in accordance with the present invention to visually represent a model of system behavior to a user. The relationship between response time and throughput may also be defined mathematically, for example based upon the distance between the two curves. In this case, the distance may be defined as the value of the throughput curve at a given load minus the value of the response time curve at the same load. The load at which this distance is maximized may be thought of as the optimal system load. It should be noted, however, that an optimal system load may be defined in a variety of ways, some of which are described below in connection with examples of methods in accordance with the present invention. A range around such an optimal system load may be identified as the optimal operating range for a system. This range may be determined, for example, as the range of loads over which the distance between the curves is a given portion, such as ninety percent, of the maximum distance. A system may be monitored and, if its load or the other measured system operating parameters exceed the optimal range, an alarm may be issued so that system operators may take appropriate steps to bring additional resources to the system or to otherwise improve system performance before system performance. Alternatively, the methods in accordance herein may be used to identify a load at which a particular parameter, such as system response time, will cease to be acceptable, and then issue an alarm when that load is reached. Likewise, in some systems other parameters, such as throughput or response time, rather than load, may be monitored with alarms being issued whenever certain threshold values are reached.

Referring now to FIG. 5, a method 500 for modeling system performance is illustrated. While method 500 illustrates a method in accordance with the present invention for modeling system response time and throughput, methods in accordance with the present invention may be used to model other network parameters. In step 512 the system's throughput may be tested using a plurality of loads to obtain a plurality of throughput data points. Any testing procedure may be used in step 512. The throughput data points obtained in step 512 are utilized in step 516 to model the system's throughput as a function of load by fitting a non-linear curve to the plurality of throughput data points. It should be appreciated that the type of non-linear curve fit to the throughput data points may vary, but may appropriately comprise a logarithmic curve. It should further be appreciated that a variety of methods may be used to fit a non-linear curve to the throughput data points. Furthermore, the number of throughput data points used to fit a curve may vary. For example, a very small number of data points, such as three, may be used in fitting a non-linear curve. Alternatively, a larger number, such as ten as illustrated in FIG. 4, or more may be used to fit a non-linear curve. One skilled in the art will realize that as the number of throughput data points increases the resulting curve will likely better model actual system performance and that a compromise between accuracy of modeling and expense of testing must sometimes be reached. However, methods in accordance with the present invention permit a more favorable compromise to be reached, in that an acceptably accurate model may be achieved using relatively few data points.

In step 514 the system's response time may be tested using a plurality of loads to obtain a plurality of response time data points. Any testing procedure may be used in step 514. step 514 may be performed in conjunction with step 512, although these steps may also be performed separately. The response time data points obtained in step 514 are utilized in step 518 to model the system's response time as a function of load by fitting a non-linear curve to the plurality of response time data points. It should be appreciated that the type of non-linear curve fit to the response time data points may vary, but may appropriately comprise an exponential curve. It should be further appreciated that a variety of methods may be used to fit a non-linear curve to the response time data points. Alternatively, a larger number of data points, such as five, or seven as illustrated in FIG. 2, or more may also be used to fit a non-linear curve. One skilled in the art will realize that as the number of response time data points increases the resulting curve will likely better model actual system performance and that a compromise between accuracy of modeling and expense of testing must sometimes be reached. However, methods in accordance with the present invention permit a more favorable compromise to be reached, in that an acceptably accurate model may be achieved using relatively few data points.

In step 520 a maximum acceptable response time may be defined. For example, users of the system may determine that a response time greater than a given predetermined amount, such as five seconds, is unacceptable. Thus, in this example, the maximum acceptable response time would be five seconds. Using the non-linear curve modeling the system's response time as a function of load, step 522 may determine the maximum system load as the load at which the maximum acceptable response time is reached. Step 524 may then determine the maximum system throughput using the model of the system's throughput to determine the throughput for the system at the maximum load. Step 520, step 322, and step 524 allow a system's operator to obtain information regarding the maximum capabilities of the system in operation. However, one or more of step 520, step 522, and step 524 may be omitted from methods in accordance with the present invention.

In step 530 a linear relationship may be defined between response time and throughput. This definition in step 530 may be used in step 532 of displaying a graph of the throughput model curve and the response time model curve in a single graph. If step 530 is omitted, step 532, if performed may display multiple graphs.

Step 530 may further permit step 534 of calculating the distance between the throughput model curve and the response time model curve. This distance may be monitored in system operation and an alarm may be issued if the distance falls below a threshold amount. The distance calculated in step 534 may be used in step 536 to determine the optimal load for the system. For example, the optimal load may be the load at which the distance between the curves is maximized. Optimal load may be defined in other ways, as well, such as the load at which a desired throughput or response time is attained or the load of which system utilization is reached. An optimal range may be defined around the optimal load for use in monitoring system performance and issuing an alarm should system performance exceed the optimal range.

Figure 6A:
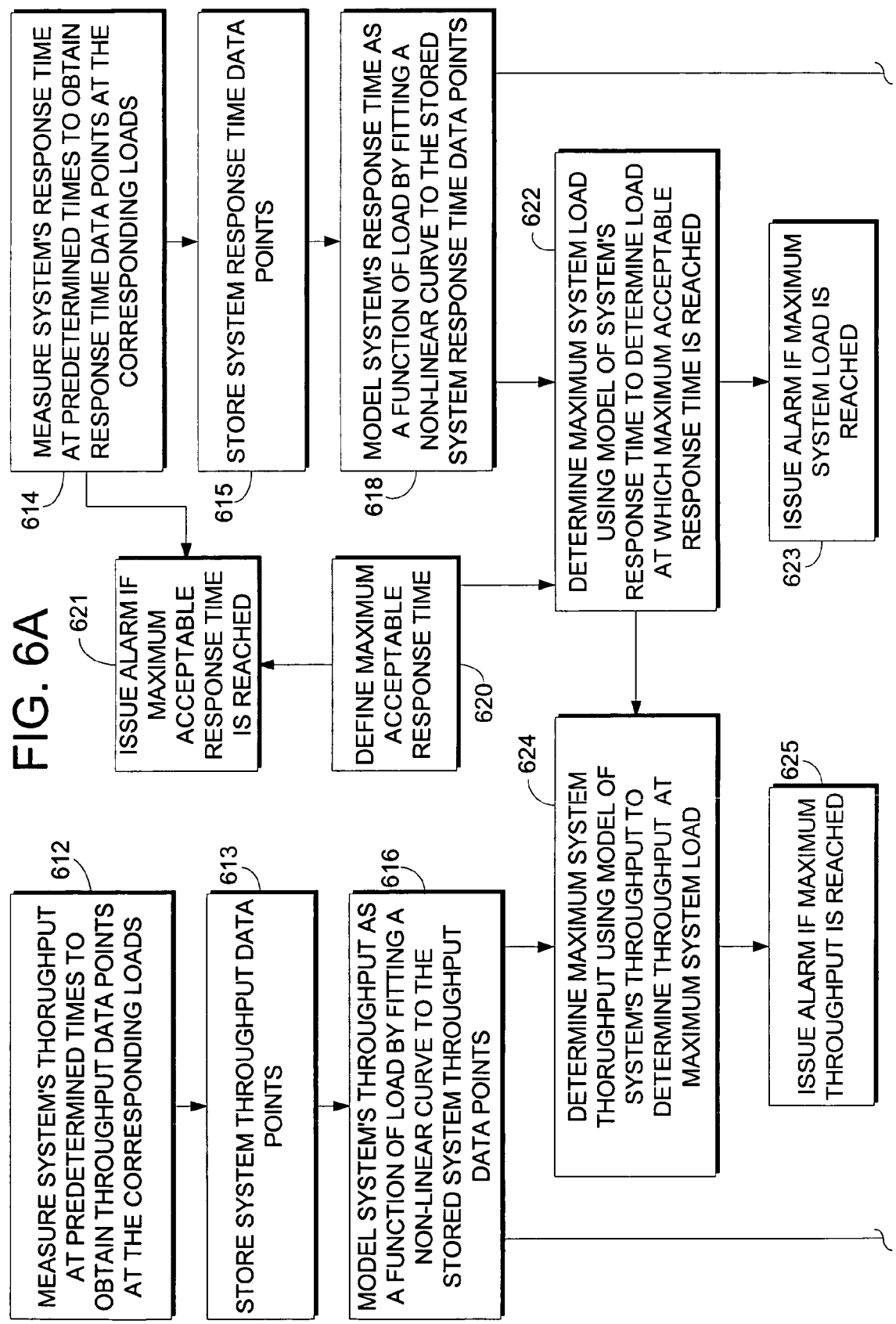
FIG. 6B illustrates a method in accordance with the present invention for modeling system performance in a production environment.
Figure 6B:
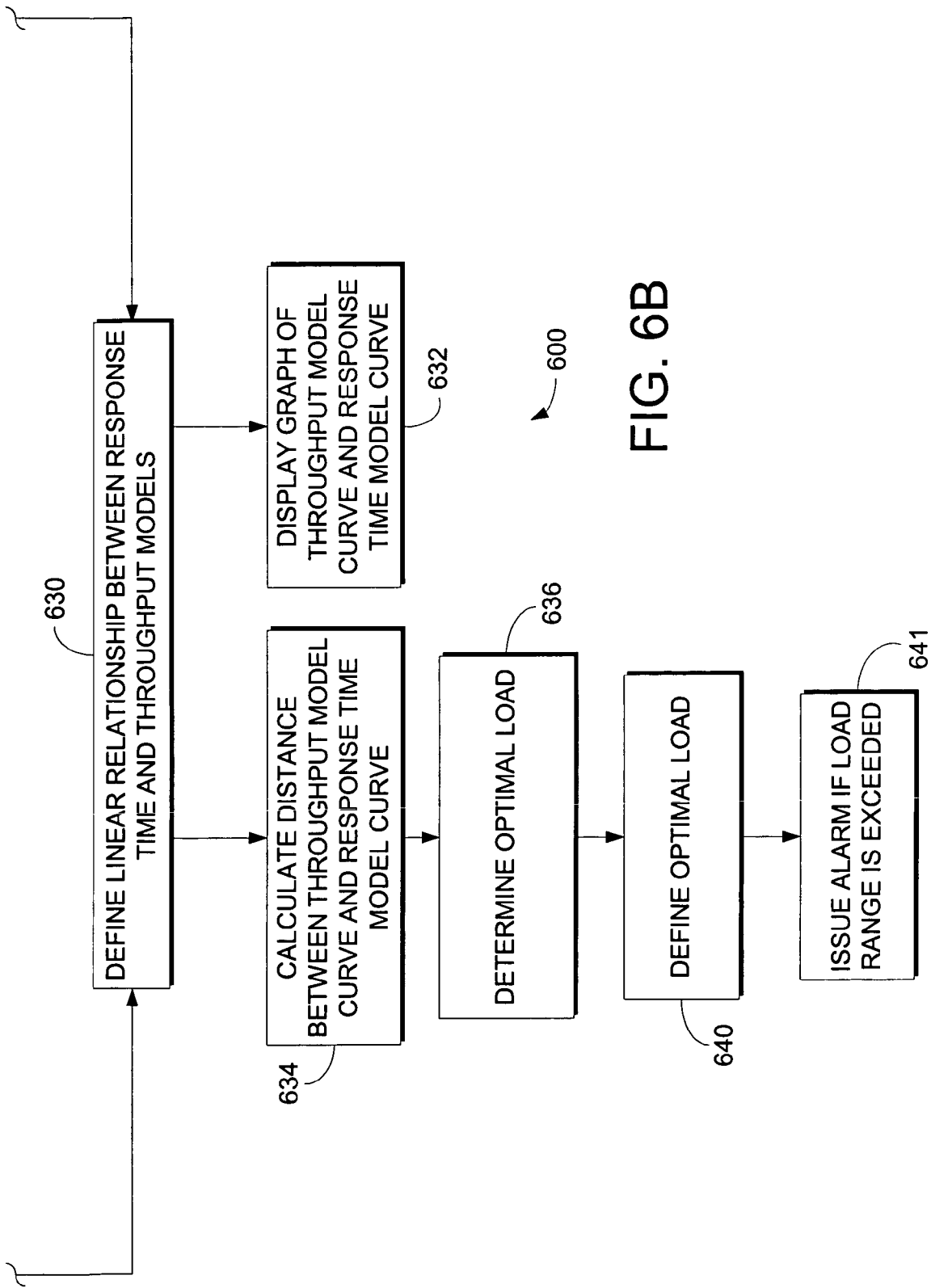

Referring now to FIG. 6, an alternative method 600 in accordance with the present invention is illustrated. While method 600 illustrates a method in accordance with the present invention for modeling system response time and throughput, methods in accordance with the present invention may be used to model other network parameters. Method 600 may be particularly suitable for modeling the performance of a system already functioning in a production environment. In step 612 the system's throughput is measured at predetermined times to obtain throughput data points at the loads existing at the measurement times. The predetermined times at which measurements are taken according to step 612 may appropriately vary from system to system. For example, measurements could be made on a daily, hourly, weekly, or other basis. Measurements could also be made after a predetermined number of system processes. In step 613 the throughput data points may be stored. Step 613 may store the throughput data points to a hard drive, in computer memory, or in any other fashion. In step 616 the throughput data points may be used to model the system's throughput as a function of load by fitting a non-linear curve to the stored system throughput data points. It should be noted that a variety of non-linear curves may be used, such as a logarithmic curve. One skilled in the art will realize that a variety of curve-fitting methodologies may be used. It should be further be noted that step 616 may be performed at a variety of times. For example, step 616 may be performed at predetermined times, such as on a daily or weekly basis. Alternatively, step 616 may be performed every time a predetermined number of new throughput data points have been stored in step 613. For example, step 616 may be performed one, ten, on hundred, or some other number of new data points have been stored in step 613. Whatever timing is used to perform step 616, it may be expected that as additional throughput data points are added the curve modeled in step 616 will increasingly and accurately reflect system throughput as a function of load. Step 616 may use every stored throughput data point, or it may use a subset of stored throughput data points, such as the data points for the last week of operation.

In step 614 the system's response time is measured at predetermined times to obtain response time at the loads existing at the measurement times. As with step 612, step 614 may be performed at a variety of times, such as on a daily, hourly, weekly, or other basis as appropriate for the system in question. In step 615 the response time data points may be stored. Step 615 may store the response time data points to a hard drive, in computer memory, or in any other fashion. In step 618 the response time data points may be used to model the system's response time as a function of load by fitting a non-linear curve to the stored system response data points. It should be noted that a variety of non-linear curves may be used, such as an exponential curve. One skilled in the art will realize that a variety of curve fitting methodologies may be used. It should be further noted that step 618 may be performed at a variety of times. For example, step 618 may be performed at predetermined times, such as on a daily or weekly basis. Alternatively, step 618 may be performed every time a predetermined number of new response time data points have been stored in step 615. Fore example, step 618 may be performed when one, ten, one hundred, or some other number of new data points have been stored in step 615. Whatever timing is used to perform step 616, it may be expected that as additional response time data points are added the curve modeled in step 618 will increasingly and accurately reflect system response time as a function of load. Step 618 may use every stored response time data point, or it may use a subset of stored response time data points, such as the data points for the last week of operation.

In step 620 a maximum acceptable response time may be defined. The maximum acceptable response time may be a predetermined amount of time within which a response must be made by the system for system performance to be deemed acceptable. For example, a maximum acceptable response time of five seconds may be used. If system response time is being monitored step 621 may issue an alarm if the maximum acceptable response time is reached or exceeded. Such an alarm may indicate that the system requires additional resources or adjustments to function properly. Alternatively, step 621 may issue an alarm when response time reaches a predetermined percentage of the maximum acceptable response time, such as, for example, eighty percent.

Based upon the maximum acceptable response time defined in step 620 and the model of the system's response time as a function of load created in step 618, step 622 may determine the maximum system load as the load at which the maximum acceptable response time is reached. In step 623 an alarm may be issued if the maximum system load is reached. Alternatively, step 623 may issue an alarm if a predetermined percentage of the maximum system load is reached, such as, for example, eighty percent. In step 624 the maximum system load determined in step 622 and the model of the system's throughput as a function load created in step 616 may be used to determine the maximum system throughput as the throughput at the maximum system load. In step 625 an alarm may be issued if the maximum acceptable response time is reached. Alternatively, step 625 may issue an alarm if a predetermined percentage of the maximum throughput is reached, for example eighty percent.

In step 630 a relationship may be defined between response time and throughput. The relationship defined in step 630 may be a linear relationship. In step 632 a graph may be displayed of the throughput model curve and the response time model curve. Step 632 may display both curves in a single graph through a graphical user interface. If step 630 is omitted, step 432 may display the curves in multiple graphs.

The relationship between throughput and response time defined in step 630 may also be used to calculate a distance between the throughput model curve and the response time model curve in step 634. Using distance as calculated in step 634, step 636 may determine an optimal load as the load at which the distance between the curves is maximized. Optimal load may be defined in other ways, as well, such as the load at which a desired throughput or response time is attained or the load at which a given system utilization is reached. Step 640 may define an optimal load range around the optimal load. In step 641 an alarm may be issued if the optimal load range defined in step 640 is exceeded.

Of course, methods in accordance with the present invention, such as method 500 and method 600, may be used to model network parameters other than system throughput and system response time. Methods in accordance with the present invention may be used to measure a first network parameter, model the first network parameter as a non-linear curve, measure a second network parameter, and model the second network parameter as a non-linear curve. Measuring the first network parameter and the second network parameter may comprise testing the system, measuring the network parameters during system operation, or a combination thereof. A relationship may be defined between the first network parameter and the second network parameter. Such a relationship may allow a distance to be determined between the curve modeling the first network parameter and the curve modeling the second network parameter. Such a relationship may also allow the display of the curve modeling the first network parameter and the curve modeling the second network parameter on a single graph.

It should be appreciated that example method 300 and example method 400 are exemplary methods in accordance with the present invention, and that many steps discussed therein may be omitted, while additional steps may be added. The methods in accordance with the present invention are not limited to any particular way of obtaining data points, whether through testing or monitoring a system in a production environment, nor are they limited to any particular method for fitting a non-linear curve to the data points obtained.

It should be further realized that a variety of actions may be taken if an alarm is issued in accordance with the present invention for a system in a production environment. Additional computing resources may be added, such as additional servers or additional system memory, the software of the system may be improved and modified to enhance efficiency, or some combination of the two may be taken. Alternatively, steps may be taken to reduce load on the system to facilitate better system performance. The steps taken by a system operator due to information obtained in practicing methods in accordance with the present invention are immaterial.

One skilled in the art will appreciate that methods in accordance with the present invention may be implemented using computer software. Such software may take the form of computer readable code embodied on one or more computer readable media. Software implementing the present invention may operate independently, but may also be incorporated with system testing software or system monitoring software. Any software language may be used to implement methods in accordance with the present invention.

The invention claimed is:

1. A method for modeling the performance of a system comprising computing software operating on computing hardware, the method comprising:
measuring a first system parameter of the system;
modeling the first system parameter as a non-linear curve;
measuring a second system parameter of the system;
modeling the second system parameter as a non-linear curve;
defining a relationship between the first system parameter and the second system parameter; and
displaying the curve modeling the first system parameter and the curve modeling the second system parameter on a single graph.

2. A method for modeling the performance of a system comprising computer software operating on computer hardware, the method comprising:
measuring system throughput data points and system response time data points at predetermined times, each data point corresponding to a system load;
storing system throughput data points and system response time data points;
modeling system throughput as a function of load by fitting a non-linear curve to the stored system throughput data points at predetermined times comprising fitting a logarithmic curve to the system throughput data points;
modeling system response time as a function of load by fitting a non-linear curve to the stored system response time data points at predetermined times comprising fitting an exponential curve to the system response time data points;
defining a linear relationship between system response time and system throughput, such that a distance may be calculated by subtracting the value at a given load of the exponential curve fit to the plurality of response time data points from the value at that given load of the logarithmic curve fit to the plurality of throughput data points;
determining the optimal system load, the optimal system load being the load at which the distance between exponential curve fit to the plurality of response time data points and the logarithmic curve fit to the throughput data points is maximized;
defining a load range above the optimal load; and
issuing an alarm when the system load exceeds the load range.

3. A method for modeling the performance of a system comprising computer software operating on computer hardware, the method comprising:
measuring system throughput data points and system response time data points at predetermined times, each data point corresponding to a system load;
storing system throughput data points and system response time data points;
modeling system throughput as a function of load by fitting a non-linear curve to the stored system throughput data points at predetermined times comprising fitting a logarithmic curve to the system throughput data points;
modeling system response time as a function of load by fitting a non-linear curve to the stored system response time data points at predetermined times comprising fitting an exponential curve to the system response time data points;
defining a maximum acceptable response time for the system;
determining the maximum system load using the exponential curve fitted to the response time data points, the maximum system load being the load at which the maximum acceptable response time is reached;

determining the maximum system throughout using the logarithmic curve fitted to the throughput data points, the maximum system throughput being the system throughput at the maximum system load; and issuing an alarm when the system load reaches the maximum system load.

4. A method for modeling the performance of a system comprising computer software operating on computer hardware, the method comprising:

measuring system throughput data points and system response time data points at predetermined times, each data point corresponding to a system load;

storing system throughput data points and system response time data points;

modeling system throughput as a function of load by fitting a non-linear curve to the stored system throughput data points at predetermined times comprising fitting a logarithmic curve to the system throughput data points;

modeling system response time as a function of load by fitting a non-linear curve to the stored system response time data points at predetermined times comprising fitting an exponential curve to the system response time data points;

defining a maximum acceptable response time for the system;

determining the maximum system load using the exponential curve fitted to the response time data points, the maximum system load being the load at which the maximum acceptable response time is reached;

determining the maximum system throughout using the logarithmic curve fitted to the throughput data points, the maximum system throughput being the system throughput at the maximum system load; and issuing an alarm when the system throughput reaches the maximum system throughput.

5. A method for modeling the performance of a system comprising computer software operating on computer hardware, the method comprising:

measuring system throughput data points and system response time data points at predetermined times, each data point corresponding to a system load;

storing system throughput data points and system response time data points;

modeling system throughput as a function of load by fitting a non-linear curve to the stored system throughput data points at predetermined times comprising fitting a logarithmic curve to the system throughput data points;

modeling system response time as a function of load by fitting a non-linear curve to the stored system response time data points at predetermined times comprising fitting an exponential curve to the system response time data points;

defining a maximum acceptable response time for the system;

determining the maximum system load using the exponential curve fitted to the response time data points, the maximum system load being the load at which the maximum acceptable response time is reached;

determining the maximum system throughout using the logarithmic curve fitted to the throughput data points, the maximum system throughput being the system throughput at the maximum system load; and issuing an alarm when the system response time reaches the maximum acceptable response time for the system.

6. A computer readable media containing embodied thereon computer readable code for causing a computer to perform a method for modeling the performance of a system comprising computing software operating on computing hardware, the method comprising:

measuring system throughput data points and system response time data points at predetermined times, each data point corresponding to a system load;

storing system throughput data points and system response time data points;

modeling system throughput as a function of load by fitting a non-linear curve to the stored system throughput data points at predetermined times comprising fitting a logarithmic curve to the system throughput data points;

modeling system response time as a function of load by fitting a non-linear curve to the stored system response time data points at predetermined times comprising fitting an exponential curve to the system response time data points;

defining a linear relationship between system response time and system throughput, such that a distance may be calculated by subtracting the value at a given load of the exponential curve fit to the plurality of response time data points from the value at that given load of the logarithmic curve fit to the plurality of throughput data points;

determining the optimal system load, the optimal system load being the load at which the distance between exponential curve fit to the plurality of response time data points and the logarithmic curve fit to the throughput data points is maximized;

defining a load range above the optimal load; and issuing an alarm when the system load exceeds the load range.

7. A computer readable media containing embodied thereon computer readable code for causing a computer to perform a method for modeling the performance of a system comprising computing software operating on computing hardware, the method comprising:

measuring system throughput data points and system response time data points at predetermined times, each data point corresponding to a system load;

storing system throughput data points and system response time data points;

modeling system throughput as a function of load by fitting a non-linear curve to the stored system throughput data points at predetermined times comprising fitting a logarithmic curve to the system throughput data points;

modeling system response time as a function of load by fitting a non-linear curve to the stored system response time data points at predetermined times comprising fitting an exponential curve to the system response time data points;

defining a linear relationship between system response time and system throughput, such that a distance may be calculated by subtracting the value at a given load of the exponential curve fit to the plurality of response time data points from the value at that given load of the logarithmic curve fit to the plurality of throughput data points;

determining the optimal system load, the optimal system load being the load at which the distance between exponential curve fit to the plurality of response time data points and the logarithmic curve fit to the throughput data points is maximized;

defining a load range above the optimal load;

issuing an alarm when the system load exceeds the load range;

defining a maximum acceptable response time for the system;

determining the maximum system load using the exponential curve fitted to the response time data points, the maximum system load being the load at which the maximum acceptable response time is reached;

determining the maximum system throughout using the logarithmic curve fitted to the throughput data points, the maximum system throughput being the system throughput at the maximum system load; and issuing an alarm when the system load reaches the maximum system load.

8. A computer readable media containing embodied thereon computer readable code for causing a computer to perform a method for modeling the performance of a system comprising computing software operating on computing hardware, the method comprising:

measuring system throughput data points and system response time data points at predetermined times, each data point corresponding to a system load;

storing system throughput data points and system response time data points;

modeling system throughput as a function of load by fitting a non-linear curve to the stored system throughput data points at predetermined times comprising fitting a logarithmic curve to the system throughput data points;

modeling system response time as a function of load by fitting a non-linear curve to the stored system response time data points at predetermined times comprising fitting an exponential curve to the system response time data points;

defining a linear relationship between system response time and system throughput, such that a distance may be calculated by subtracting the value at a given load of the exponential curve fit to the plurality of response time data points from the value at that given load of the logarithmic curve fit to the plurality of throughput data points;

determining the optimal system load, the optimal system load being the load at which the distance between exponential curve fit to the plurality of response time data points and the logarithmic curve fit to the throughput data points is maximized;

defining a load range above the optimal load;

issuing an alarm when the system load exceeds the load range;

defining a maximum acceptable response time for the system;

determining the maximum system load using the exponential curve fitted to the response time data points, the maximum system load being the load at which the maximum acceptable response time is reached;

determining the maximum system throughout using the logarithmic curve fitted to the throughput data points, the maximum system throughput being the system throughput at the maximum system load; and issuing an alarm when the system throughput reaches the maximum system throughput.

* * * * *